(12) United States Patent
Ravi et al.

(10) Patent No.: US 12,457,275 B2
(45) Date of Patent: **\*Oct. 28, 2025**

(54) APPLICATION BASED EGRESS INTERFACE SELECTION

(71) Applicant: VMware LLC, Palo Alto, CA (US)

(72) Inventors: Madhusudhan Ravi, San Jose, CA (US); Wilson Wang, Mountain View, CA (US); Rajeev Nair, Newark, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,943

(22) Filed: Jun. 21, 2024

(65) Prior Publication Data

US 2024/0348704 A1    Oct. 17, 2024

Related U.S. Application Data

(63) Continuation of application No. 17/952,318, filed on Sep. 26, 2022, now Pat. No. 12,021,952, which is a
(Continued)

(51) Int. Cl.
*H04L 69/16* (2022.01)
*H04L 45/00* (2022.01)
(Continued)

(52) U.S. Cl.
CPC .......... *H04L 69/162* (2013.01); *H04L 45/306* (2013.01); *H04L 45/54* (2013.01); *H04L 45/745* (2013.01); *H04L 47/125* (2013.01)

(58) Field of Classification Search
CPC ......... H04L 69/16; H04L 45/00; H04L 45/30; H04L 45/74; H04L 47/12; H04L 45/745;
(Continued)

(56) References Cited

U.S. PATENT DOCUMENTS 7,606,160 B2 * 10/2009 Klinker .................. H04L 65/80
370/252
7,830,896 B2 * 11/2010 Srivastava .......... H04L 67/1001
370/392

(Continued)

*Primary Examiner* — Man U Phan
(74) *Attorney, Agent, or Firm* — Quarles & Brady LLP

(57) ABSTRACT

A method of selecting an egress interface for a source process running on an electronic device is provided. The device implements a TCP/IP stack utilized by a plurality of applications for sending network packets. The method receives a packet from a particular application in the plurality of applications to send to a network destination over a socket tagged with an identifier of the particular application. The method compares the socket tag with a set of network egress interface tags. Each network egress interface tag is associated with a network egress interface in a plurality of network egress interfaces. Each network egress interface tag includes the identifier of an application that utilizes the network egress interface. The method selects a network egress interface with a tag that matches the socket tag. The method sends the packet to the network destination through the selected network egress interface.

14 Claims, 7 Drawing Sheets

Related U.S. Application Data continuation of application No. 16/920,415, filed on Jul. 2, 2020, now Pat. No. 11,457,096, which is a continuation of application No. 16/048,680, filed on Jul. 30, 2018, now Pat. No. 10,721,338.

(60) Provisional application No. 62/539,347, filed on Jul. 31, 2017.

(51) Int. Cl.
*H04L 45/302* (2022.01)
*H04L 45/745* (2022.01)
*H04L 47/125* (2022.01)

(58) Field of Classification Search
CPC ..... H04L 47/125; H04L 45/54; H04L 69/162; H04L 45/306; H04L 29/06; H04L 12/741; H04L 12/725
USPC .......................................................... 370/392
See application file for complete search history.

(56) References Cited

U.S. PATENT DOCUMENTS

| | | | | |
|---|---|---|---|---|
| 7,861,167 | B2 | 12/2010 | Fernando et al. | |
| 8,014,278 | B1 * | 9/2011 | Subramanian | H04L 47/125 370/235 |
| 8,606,911 | B2 * | 12/2013 | Raleigh | H04M 15/66 709/224 |
| 9,571,342 | B2 * | 2/2017 | Chao | H04L 41/083 |
| 9,608,902 | B2 | 3/2017 | Malik et al. | |
| 9,876,719 | B2 * | 1/2018 | Revah | H04L 45/7453 |
| 9,954,791 | B2 * | 4/2018 | Sreeramoju | H04L 47/36 |
| 10,038,616 | B2 | 7/2018 | Talat et al. | |
| 10,116,515 | B2 * | 10/2018 | MacFaden | G06F 9/452 |
| 10,243,857 | B1 * | 3/2019 | Mizrahi | H04L 43/0817 |
| 10,326,675 | B2 * | 6/2019 | Raleigh | H04W 24/08 |
| 10,721,338 | B2 | 7/2020 | Ravi et al. | |
| 11,457,096 | B2 | 9/2022 | Ravi et al. | |
| 2014/0321290 | A1 | 10/2014 | Jin et al. | |
| 2014/0325228 | A1 * | 10/2014 | Roitshtein | H04L 47/125 713/171 |
| 2018/0367438 | A9 * | 12/2018 | Liang | H04L 45/306 |
| 2019/0068759 | A1 | 2/2019 | Ravi et al. | |
| 2020/0336571 | A1 | 10/2020 | Ravi et al. | |

\* cited by examiner

APPLICATION BASED EGRESS INTERFACE SELECTION

CLAIM OF BENEFIT TO PRIOR APPLICATIONS

This application is a continuation application of U.S. patent application Ser. No. 17/952,318, filed Sep. 26, 2022, now issued as U.S. Pat. No. 12,021,952. U.S. patent application Ser. No. 17/952,318 is a continuation application of U.S. patent application Ser. No. 16/920,415, filed Jul. 2, 2020, now issued as U.S. Pat. No. 11,457,096. U.S. patent application Ser. No. 16/920,415 is a continuation application of U.S. patent application Ser. No. 16/048,680, filed Jul. 30, 2018, now issued as U.S. Pat. No. 10,721,338. U.S. patent application Ser. No. 16/048,680 claims the benefit of U.S. Provisional Patent Application 62/539,347, filed Jul. 31, 2017. The contents of U.S. patent Ser. Nos. 17/952,318, 16/920,415, and 16/048,680, now issued respectively as U.S. Pat. Nos. 11,457,096 and 10,721,338, and U.S. Provisional Patent Application 62/539,347 are hereby incorporated by reference.

BACKGROUND

On the hosts that have multiple egress interfaces, applications that need to steer traffic via a specific egress interface need to explicitly bind to the interface. The applications have to include code to perform route look up, select an interface for sending packets to a particular destination, and bind the socket to the selected interface.

In addition, when there are multiple interfaces that an application could use to send a packet to a destination, the application has to bind to each interface one by one based on the destination IP for route reachability. The application has to also include code to choose one of the interfaces by load balancing, round robin selection, or other methods.

BRIEF SUMMARY

Some embodiments provide a method of selecting an egress interface in an electronic device that implements a TCP/IP (transport control protocol/Internet protocol) stack utilized by several applications. The method receives a packet from a particular application to send to a network destination over a socket that is tagged by the particular application with the identifier of the particular application.

The method compares the socket tag with a set of network egress interface tags. Each network egress interface tag is associated with one or more network egress interfaces. Each network egress interface tag includes an identifier of an application that utilizes the network egress interface. The method selects a network egress interface with a tag that matches the socket tag and sends the packet to the network destination through the selected network egress interface.

When the tag of several egress interfaces matches the socket tag, the method selects one of the egress interfaces by performing load balancing, using round robin algorithm, or selecting an egress interface by using a first match criteria. The method in some embodiments is performed by the TCP/IP stack and therefore removes from the applications the necessity for including code to perform route look up, selecting an interface for sending packets to a particular destination, performing load balancing, performing round robin selection, etc.

Each network egress interface in some embodiments is defined by a set of parameters and each tag marks the set of parameters that defines the associated network egress interface with the identifier of the application that utilizes the associated network egress interface. The set of parameters in some embodiments is stored in a data structure that is accessible by the TCP/IP stack. The applications that send packets do not identify the egress interface for sending packets and do not access the set of parameters that define the network egress interfaces.

When the network destination for sending the packet is outside the electronic device, sending the packet to the network destination requires sending the packet through a gateway connected to the selected interface. Sending the packet to the network destination through the selected egress interface in some embodiments includes sending the packet through the network interface to a physical network interface card (PNIC) and sending the packet from the PNIC to the network destination.

The identifier of the particular application in some embodiments is a specific identifier of the application. For instance, the identifier is the name of the application or the universally unique identifier (UUID) of the application. In other embodiments, the identifier of the application is a generic identifier that identifies the type of the particular application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
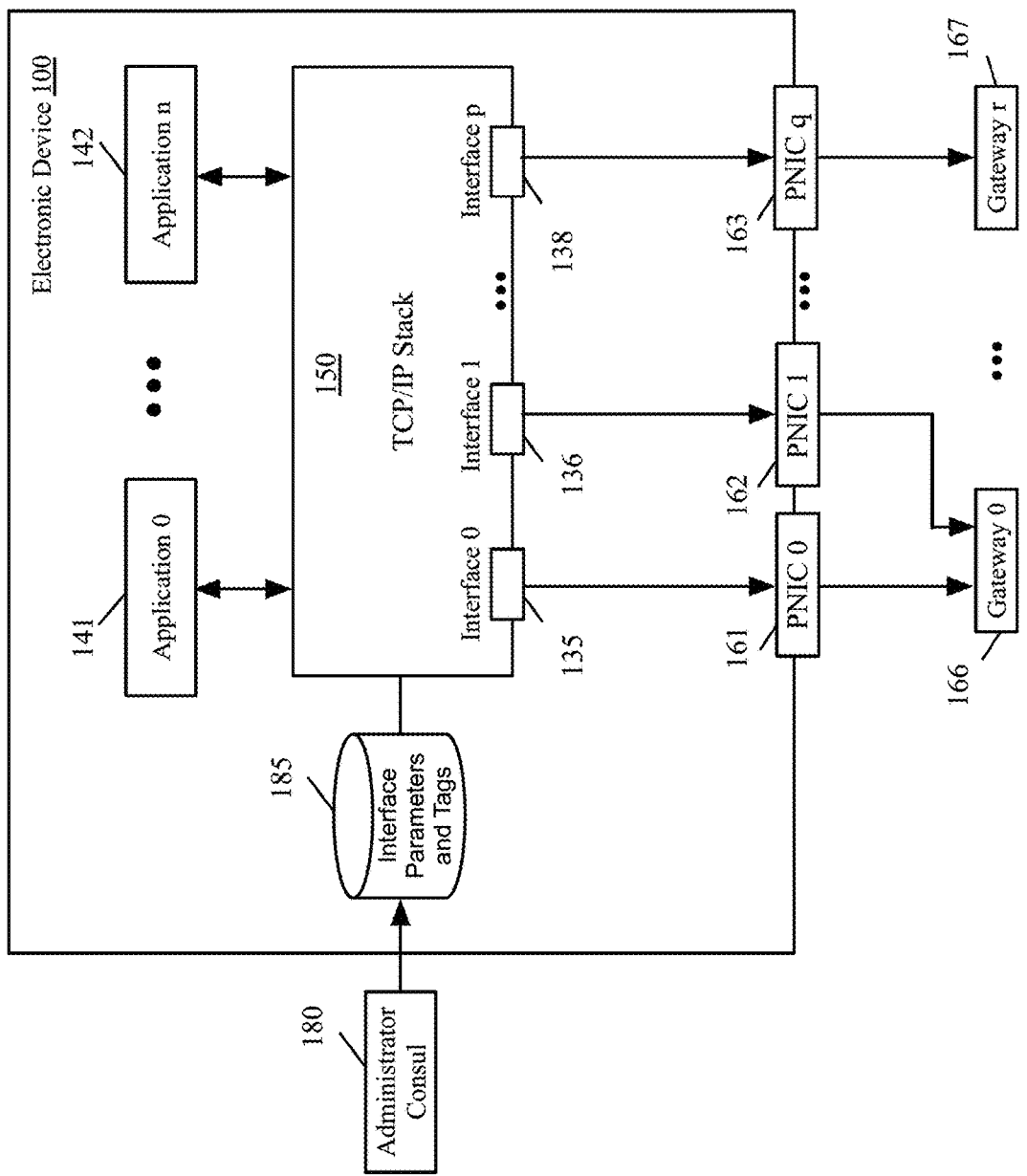
FIG. 1 conceptually illustrates an electronic device in some embodiments in which several network egress interfaces are tagged with the identification of applications that use the interfaces.

Some embodiments of the invention provide a method for identifying a network egress interface for sending a packet from an application to a network destination. Each application tags its socket(s) with an identification of the application. The tag in some embodiments is a specific identifier such as the application name. In other embodiments, the tag is generic such as the application type. For instance, the tag may identify the type of the application such as web application, backend application, etc.

The administrator (or the user) of the application also sets similar tags on the network egress interfaces used by each application. The protocol stack (e.g., the TCP/IP stack) then selects the egress interface by doing route look up and comparing the socket tag and the egress interface tags. The protocol stack selects an egress interface with a tag that matches the socket tag.

When there are multiple interfaces that satisfy route lookups and matching tags, the stack selects one of the egress interfaces by using a method such load balancing, round robin selection, first match selection, etc., amongst the interfaces. This tagging method also allows a network administrator to control the application traffic flow via each interface by changing the interface tagging at run time.

I. Identifying Egress Interfaces Based on the Applications that Use the Interfaces FIG. 1 conceptually illustrates an electronic device in some embodiments in which several network egress interfaces are tagged with the identification of applications that use the interfaces. The electronic device 100 is a device such as a computer, a host machine on a multi-tenant datacenter, a host machine on a single tenant enterprise network, a server, a client device, etc. The device 100 includes several applications (or processes) 141-142, a protocol stack 150 such as TCP/IP stack, and several physical network interface cards (PNICs) 161-163. A protocol stack is a set of network protocol layers and the software processes that implement the protocol.

Some of the applications 141-142 require network access. That is, the applications require data to be processed by the TCP/IP stack 150 to produce packets and sent over a network, such as the Internet. TCP/IP stack 150 is a software construct that manipulates data received from various applications 141-142, converts the data into IP packets that can be sent through to a network (e.g., a public datacenter, an enterprise network, the Internet, etc.).

The term "packet" is used in this application to refer to a collection of bits in a particular format sent across a network. It should be understood that the term "packet" may be used herein to refer to various formatted collections of bits that may be sent across a network, such as Ethernet frames, TCP segments, UDP datagrams, IP packets, etc.

A TCP/IP stack is used to process data through several different layers. For instance, when outputting data, the data may be sent to a socket buffer and processed at the TCP layer to create TCP segments or packets. Each segment is then processed by a lower layer, such as the IP layer to add an IP header. The output of the TCP/IP stack is a set of packets associated with outbound data flow. On the other hand, when receiving data at the device 100, each packet may be processed by one or more of the layers in reverse order to strip one or more headers, and place the user data or payload in an input socket buffer.

A TCP/IP stack 170 includes one or more interfaces (e.g., virtual adapters (or virtual kernel network interface cards VKNICs)) 135-138, which are software constructs that the TCP/IP stack 150 uses to connect to a PNIC 161-163 (either directly or through a software switch). PNICs 161-163 are hardware elements that receive packets from within the device 100 that have destinations outside the host and forward those packets toward their destinations. PNICs 161-163 also receive packets from outside the device 100 (e.g., from a local network or an external network such as the Internet) and forward those packets to the TCP/IP stack 150 (either directly or through a software switch) for distribution within the device 100.

In some embodiments, interfaces 135-138 are configured by an administrator. The administrator defines a set of parameters for each interface. The parameters in some embodiments include an IP address that identifies the interface. The administrator also determines which application 141-142 is going to use each interface 135-138. The administrator tags each interface 135-138 with an identification of the application that is going to use the interface.

The operating system of the device receives the set of parameters that defines each interface and the associated tag from an administrator consul 180 (e.g., through an API). The operating system of the device stores the interface definitions and the associated tags in a set of data structures 185 (e.g., in one or more tables), which are used by the TCP/IP stack to identify the interfaces.

As an example, application 141 may need to use two interfaces 135 and 136. Interface 135 is assigned an IP address of 192.168.10.5/16. (i.e., an IP address of 192.168.10.5 in a subnet that includes IP addresses 192.168.0.0 through 192.168.255.255). All devices in the same network (or subnet) have the same network prefix. The network prefix is expressed in Classless Inter-Domain Routing (CIDR) notation, which expresses the network prefix followed by a slash character ("/"), followed by the length of the prefix in bits. For instance, in Internet Protocol Version 4 (IPv4) the IP addresses include 32 bits and 172.16.0.1/20 indicates that 20 bits of the IP address are allocated for the subnet and the remaining 12 bits are used to identify individual hosts on the subnet. In the following discussions, IPv4 IP addresses are used in several examples. The discussions are similarly applicable to other IP protocols such as Internet Protocol version 6 (IPv6).

Interface 136 in this example is assigned an IP address of 192.168.11.6/16 (i.e., an IP address of 192.168.11.6 in the subnet that includes IP addresses 192.168.0.0 through 192.168.255.255). Interface 138 is assigned an IP address of 10.0.0.6/24 (i.e., an IP address of 10.0.0.6 in a subnet that includes IP addresses 10.0.0.0 through 10.0.0.255). In this example, interfaces 135 and 136 are assigned to application 141 and interface 138 is assigned to application 142.

Figure 2:
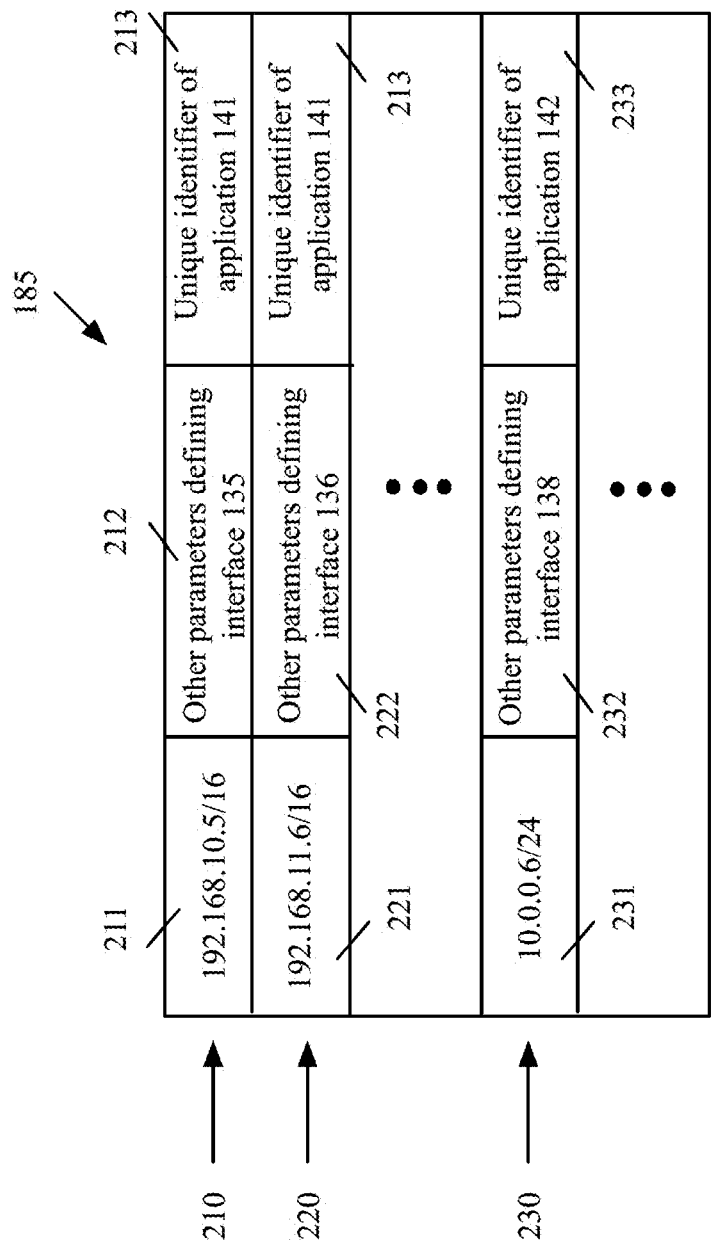
FIG. 2 conceptually illustrates the content of the data structures of FIG. 1 that store the interface parameters and tags in some embodiments.

FIG. 2 conceptually illustrates the content of the data structures 185 of FIG. 1 that store the interface parameters and tags in some embodiments. As shown, the data structure 210 that stores the set of parameters that define interface 135 includes the IP address 211 assigned to interface 135 as well as a set of other parameters 212. For a TCP socket, the set of other parameters include a port number assigned to the socket. The set of other parameters also includes the protocol (e.g., TCP, UDP, etc., used for communication through the socket). Once a socket is connected to anther socket in the destination node, the set of other parameters would also include the IP address of the remote socket. Each socket data structure 210-230 is referred to by a unique socket descriptor (e.g., a unique integer number).

Data structure 210 also includes a tag 213 that includes an identifier of application 141. The identifier in some embodiments is a unique identifier assigned to the application. For instance, the unique identifier in some embodiments is the universally unique identifier (UUID) of application 141. In other embodiments, the unique identifier is a unique name assigned to application. Yet in other embodiments, the identifier is a generic identifier such as application type (e.g., web application, backend application, database application, etc.).

Data structure 220 that stores the set of parameters that define interface 136 includes the IP address 221 assigned to interface 136 as well as a set of other parameters 222. Data structure 220 also includes a tag 213 that includes the unique identifier of application 141. Data structure 230 that stores the set of parameters that define interface 138 includes the IP address 231 assigned to interface 138 as well as a set of other parameters 232. Data structure 230 also includes a tag 233 that includes the unique identifier of application 142.

As shown, the two interfaces 135 and 136 have different IP addresses 211 and 221 respectively. The definition of both interfaces 135 and 136 are tagged with the identifier of application 140 to indicate that both interfaces are assigned to and used by application 141. In contrast, the definition of interface 138 is tagged with the identifier of application 142 to indicate that the interface is assigned to and used by application 141.

Referring back to FIG. 1, each interface 135-138 is connected (either directly or through a software switch) to a PNICs 161-163. Interfaces 135 and 136 are on the same subnet (i.e., subnet 192.168.0.0/16). The associated PNICs 161-162 are, therefore, connected to the same gateway 166 (e.g., with IP address 192.168.0.1).

Interface 138 is on subnet 10.0.0.6/24, which is a different subnet than subnet 192.168.0.0/16. The PNIC 0163 associated with interface 138 is, therefore, connected to a different gateway 167 (e.g., with IP address 10.0.0.1) than gateway 166.

In order to establish a connection to a network destination, each application requests the TCP/IP stack to create a socket, (or a network endpoint) for the application to communicate with the network destination. The network destination may be a destination outside device 100. The TCP/IP stack creates the socket (e.g., in the form of a table entry) that identifies the source, destination, protocol, status, etc., for the connection. The TCP/IP stack also sends a request to the network destination to create a socket at the destination network node to establish the connection. It should be understood that the socket could also be created for an application 141-142 when another application (e.g., outside device 100) requests to communicate with an application.

Once the connection is established, the application binds to the connection to enable communication. The application can then send packets to the network destination by using the established socket. Once the communication is completed, the application requests the TCP/IP stack to close the socket. Creating a socket, binding, sending and receiving packets over the socket, and closing the socket are done by using a set of application programming interface (API) calls.

Since the interfaces 135-138 are tagged by application identifiers, each application in some embodiments tags the socket that the application uses for sending a packet with the identifier of the application. The TCP/IP stack compares the socket tag with the interface tags to identify one or more interfaces with tags that match the socket tag.

For instance, application 141 tags a socket with the application identifier 213 (shown in FIG. 2) and sends the packet to the TCP/IP stack to in turn send the packet to a network destination. The TCP/IP stack identifies interfaces 135 and 136 as the interfaces with tags that match the socket tag. The TCP/IP tag then selects one of the interfaces (e.g., by doing load balancing, round robin selection, first match selection, etc.) to send the packet to the destination. As shown, both interfaces 135-136 are connected to the same gateway 166 through the corresponding PNICs 161-162.

When there is only one interface tag that matches a socket tag the TCP/IP selects the matching interface for sending the packet to the destination. For instance, application 142 tags a socket with the application identifier 233 (shown in FIG. 2) and sends the packet to the TCP/IP stack to in turn send the packet to a network destination. The TCP/IP stack identifies interface 138 as the interface with a tag that matches the socket tag. The TCP/IP tag then selects interfaces 138 to send the packet to the destination trough gateway 167.

Figure 3:
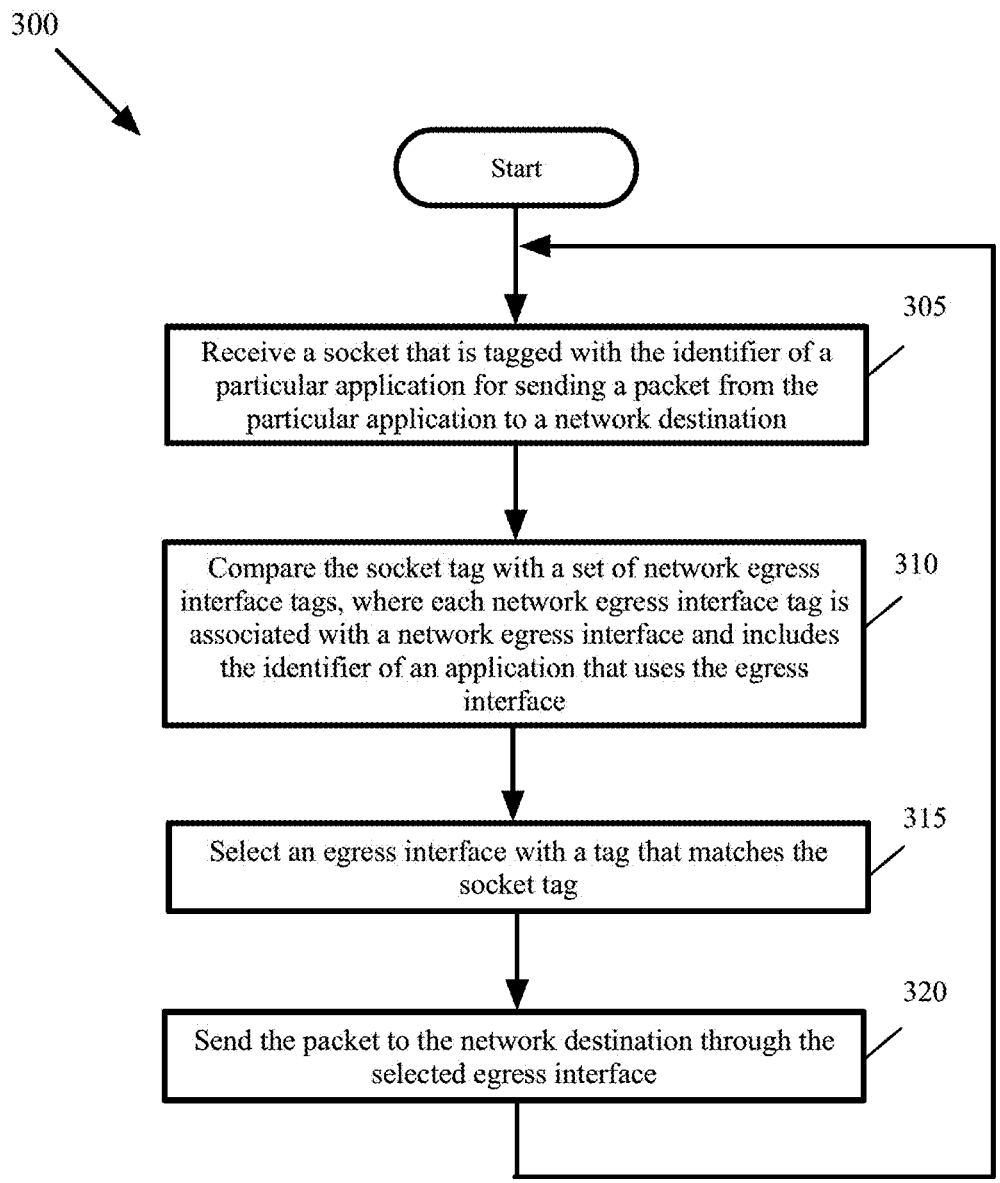
FIG. 3 conceptually illustrates a process for identifying an egress interface in some embodiments.

FIG. 3 conceptually illustrates a process 300 for identifying an egress interface in some embodiments. The process in some embodiments is performed by a protocol stack such as the TCP/IP stack in FIG. 1 that is utilized by a group of applications for sending and receiving network packets. As shown, the process receives (at 305) a packet from a particular application in the group of applications to send a network destination over a socket. The socket is identified by a socket descriptor (e.g., a unique integer number).

The socket identification is further tagged with the identifier of the particular application. For instance, Application 141 in FIG. 1 sends a packet with a socket descriptor that is tagged with the unique identifier 213 of the application as shown in FIG. 2. The identifier in some embodiments is a unique identifier such as the UUID of application. In other embodiments, the unique identifier is a unique name assigned to application. Yet in other embodiments, the identifier is a generic identifier such as application type.

Next, the process compares (at 310) the socket tag with a set of network egress interface tags. Each network egress interface tag is associated with a network egress interface and includes the identifier of an application that uses the egress interface. For instance, the process compares tags 213-233 (shown in FIG. 2) with the socket tag received from one of applications 141-142 in FIG. 1.

The process then selects (at 315) an egress interface with a tag that matches the socket tag. For instance, when process 141 tags a socket with the unique identification 213 of the application, the process identifies interfaces 135 and 136 as the interfaces with a tag that matches the socket tag. The process selects one of the two interfaces (e.g., by doing load balancing, round robin selection, first match selection, etc.). The process then sends (at 320) the packet to the network destination through the selected egress interface. The process then proceeds to 305, which was described above.

The tagging mechanism described by reference to FIGS. 1-3 provides several advantages over the prior art methods of identifying an egress interface. In prior art systems, an application such as applications 141-142 has to identify the egress interface. The application developer has to include code in the application to perform a route look up, select an interface for sending the packet, and bind the socket to the selected interface. This requires that every application include this extra code. The APIs for performing route look up and selecting an interface are not always exposed to application developers and the developers have to write code to perform these tasks. In case of any change to the system data structures, every application should be revised to adapt to the new changes.

Using the novel tagging mechanism disclosed herein only requires that each application tag the application socket(s) with the application identifier. The applications do not have to identify an interface for sending the packets to a network destination. Each application developer knows the identifier of the application. The developer adds code to the application to tag the sockets with the application identifier.

An administrator in turn tags the interfaces that are assigned to each application with the identifier of the application during deployment. The applications then simply tag the sockets and send the packet transmission request to the protocol stack. The protocol stack identifies the egress interface by matching the socket tag with one or more egress interface tags and selects one of the egress interfaces (e.g., by load balancing, round robin selection, etc.) for sending the packet to the packet destination.

The tagging method also allows a network administrator to control the application traffic flow via each interface by changing the interface tagging at run time. When the network administrator decides to reassign an interface from a first application to a second application, the administrator can simply change the interface tag from the first application identifier to the second interface identifier. The network administrator can also assign a new interface to an application by defining the interface and the interface with the application identification. The network administrator can also un-assign an interface from an application by removing the application tag form the interface.

Figure 4:
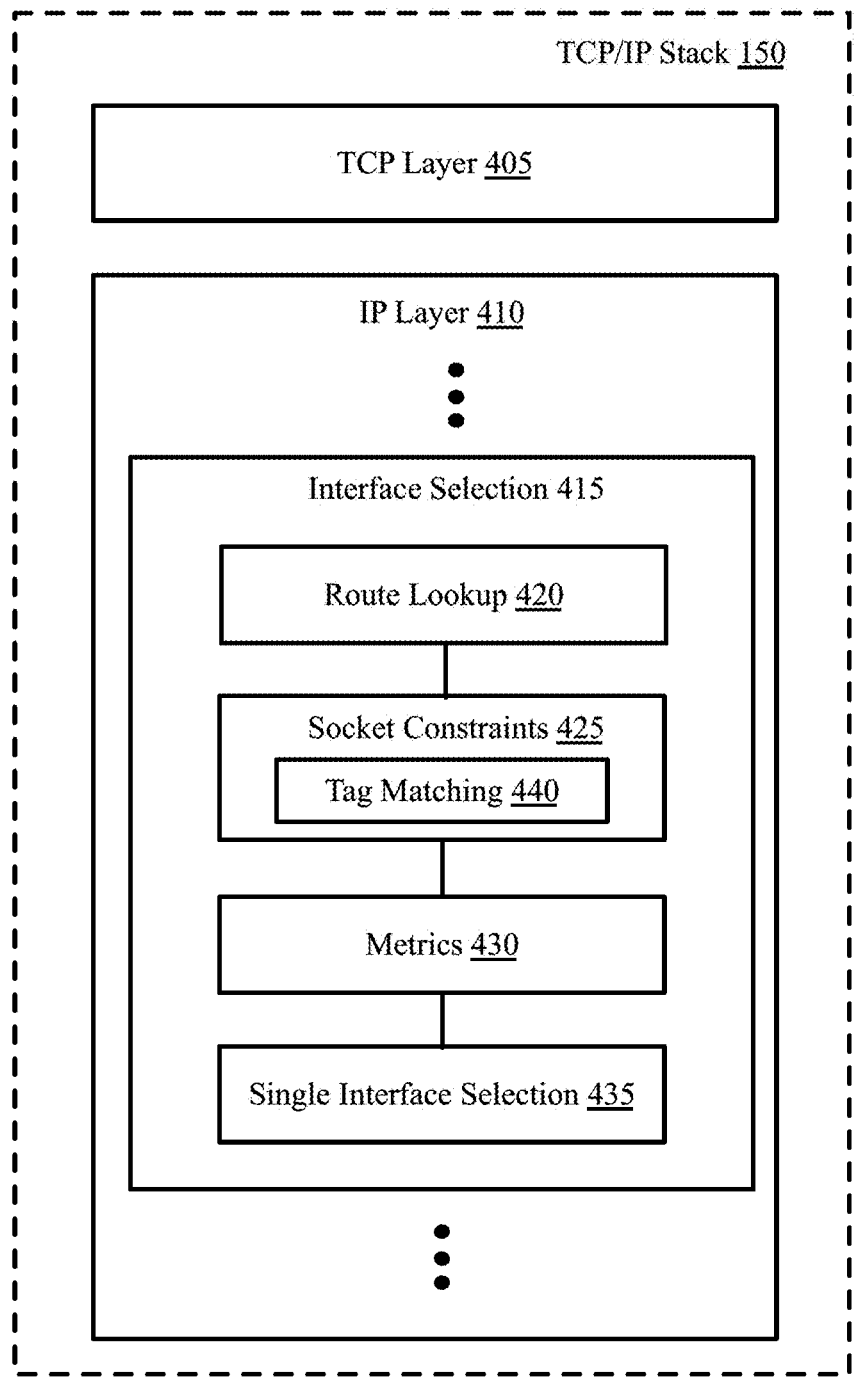
FIG. 4 conceptually illustrates a block diagram of a portion of a protocol stack that selects egress interfaces based on interface and socket tags in some embodiments.

Selecting an egress interface based on interface and socket tags require several changes to a typical TCP/IP stack. FIG. 4 conceptually illustrates a block diagram of a portion of a TCP/IP stack that selects egress interfaces based on interface and socket tags in some embodiments. As shown, the TCP/IP stack 150 includes a TCP layer 405 and an IP layer 410.

The IP layer includes an interface selection component 415 that selects an egress interface for sending a packet to a network destination. Other components of the IP layer 410 and the components of the TCP layer 405 are not shown for simplicity. The interface selection component 415 includes route lookup 420, socket constraints 425, metrics 430, and single interface selection 435 components.

The route look up component 420 performs a route look up based on the source and destination IP addresses and source and destination port numbers in a packet. The socket constraint component 425 selects a set of interfaces based on the socket constraints. As shown, socket constraint component 425 includes a tag matching component 440. The tag matching component compare a socket tag with the interface tags to identify one or more interfaces with the same tag as the socket tag. For instance, tag matching component performs operation 310 in FIG. 3 and selects a set of interfaces with the same tag as a socket tag.

The metrics component 430 examines interface metrics to further constraints the interface selection. The single interface selection component 435 selects one of several interfaces when there are multiple interfaces with a tag that match a socket tag. For instance, a socket that is tagged with the identifier 123 of application 141 matches both interface 135 and 136 (as described above by reference to FIG. 2). In different embodiments, the single interface selection component uses different methods such as load balancing, round robin selection, or first match selection to select one of the several egress interfaces with a tag that matches a socket tag.

Figure 5:
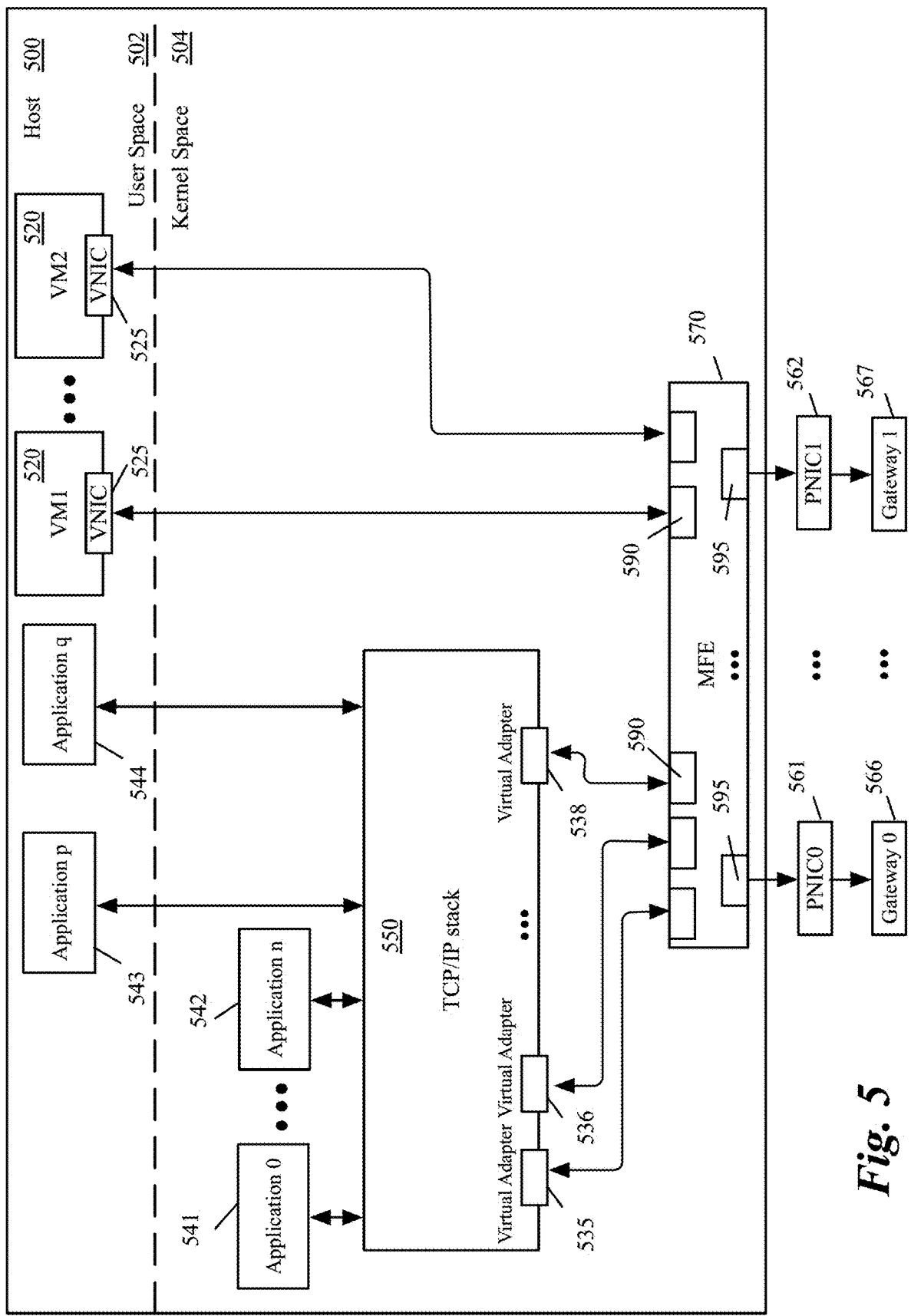
FIG. 5 conceptually illustrates an example of the embodiments where the electronic device of FIG. 1 is a host machine.

FIG. 5 conceptually illustrates an example of the embodiments where the electronic device of FIG. 1 is a host machine. The host machine 500 could be a host machine on a multi-tenant datacenter or a host machine on a single tenant enterprise network. As shown, the host 500 implements a user space 502 and a kernel space 504. In the user space 502, the host 500 implements virtual machines (VMs) 520 with virtual network interface cards (VNICs) 525. The user space also includes user application 543-544, which do not execute inside any VMs and communicate with the TCP/IP stack 550 in the kernel space to send and receive packets.

In the kernel space 504, the host 500 implements multiple kernel applications (or processes) 541-542, the TCP/IP stack 550, and a managed forwarding element (MFE) 570. The host 500 includes several physical network interface cards (PNICs) 560. The user space 502 and kernel space 504 are divisions of the computing capabilities of the host machine 500 and may be implemented using different sets of application programming interfaces (APIs). Accordingly, processes running in the user space 502 may have different restrictions on them, and/or have access to different resources, than processes running in the kernel space 504.

The virtual machines 520 simulate separate computers. The virtual machines 520 can be virtual machines controlled by a single entity (e.g., a single tenant) or can be controlled by multiple entities (e.g., multiple tenants). The virtual network interface cards (VNICs) 525 are software constructs that the virtual machines 520 use to connect to the MFE 570 in the kernel space 504.

In the virtualization field, some refer to software switches as virtual switches as these are software elements. However, in this specification, the software forwarding elements are referred to as MFEs, in order to distinguish them from logical forwarding elements (LFEs), which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

MFE 570 is a software construct that receives IP packets from within the host 500 and routes them toward their destinations (inside or outside the host 500). MFE 570 also receives packets from outside the host 500 and routes them to their destinations in the host 100. The MFE includes several ports 590 for connecting to the TCP/IP virtual adapters 535-538 and VM VNICS 525. The MFE also includes several ports 595 for connecting to the PNICs 561-562.

In some embodiments, the kernel applications 541-542 are virtualization software (e.g., hypervisor) services for virtualizing physical resources of the host machine. In some embodiments, virtualization software services do not include processes running on a virtual machine. Some virtualization software services require network access. That is, the services require data to be processed by the TCP/IP stack 550 to produce packets and sent over a network, such as the Internet. Examples of such type of virtualization software services include, in some embodiments, a virtual machine migrator that transfers a virtual machine between hosts, virtual storage area network (VSAN) that aggregates locally attached disks in a virtualization software cluster to create a storage solution that can be provisioned remotely through a client, a network file system (NFS) component that can be used to mount storage drive remotely, etc.

TCP/IP stack 550 is a software construct that manipulates data received from various applications 641-544, converts the data into IP packets that can be sent through the MFE 570 and then out to a network (e.g., a public datacenter, an enterprise network, the Internet, etc.). As shown, the TCP/IP stack 570 includes one or more virtual adapter (or a kernel network interface card KNIC) 535-538, which are software constructs that the TCP/IP stack 550 uses to connect to the MFE 570 (or in some cases to connect directly to a PNIC 561-562). PNICs 561-562 are hardware elements that receive packets from within the host 500 that have destinations outside the host and forward those packets toward their destinations. PNICs 561-562 also receive packets from outside the host (e.g., from a local network or an external network such as the Internet) and forward those packets to the MFE 570 for distribution within the host 500.

In order to establish a connection to a network destination, each application requests the TCP/IP stack to create a socket, (or a network endpoint) for the application to communicate with the network destination. The network destination may be a destination outside host 500. The TCP/IP stack creates the socket (e.g., in the form of a table entry) that identifies the source, destination, protocol, status, etc., for the connection. The TCP/IP stack also sends a request to the network destination to create a socket at the destination network node to establish the connection. It should be understood that the socket could also be created for an application 541-544 when another application (e.g., outside host 500) requests to communicate with an application.

Once the connection is established, the application binds to the connection to enable communication. The process can then send packets to the network destination by using the established socket. Once the communication is completed, the application requests the TCP/IP stack to close the socket. Creating a socket, binding, sending and receiving packets over the socket, and closing the socket are done by using a set of application programming interface (API) calls.

The TCP/IP stack 550 in FIG. 5 is used by non-virtual machine applications 541-544. Each VM 520 includes a guest operating system that is separate from the operating system (or the kernel) of the host 100. The applications and processes that run inside VMs 520 do not use the host TCP/IP stack 550. Instead, the guest operating system of each VM includes a TCP/IP stack that is sued by the applications and processes inside the VM.

Figure 6:
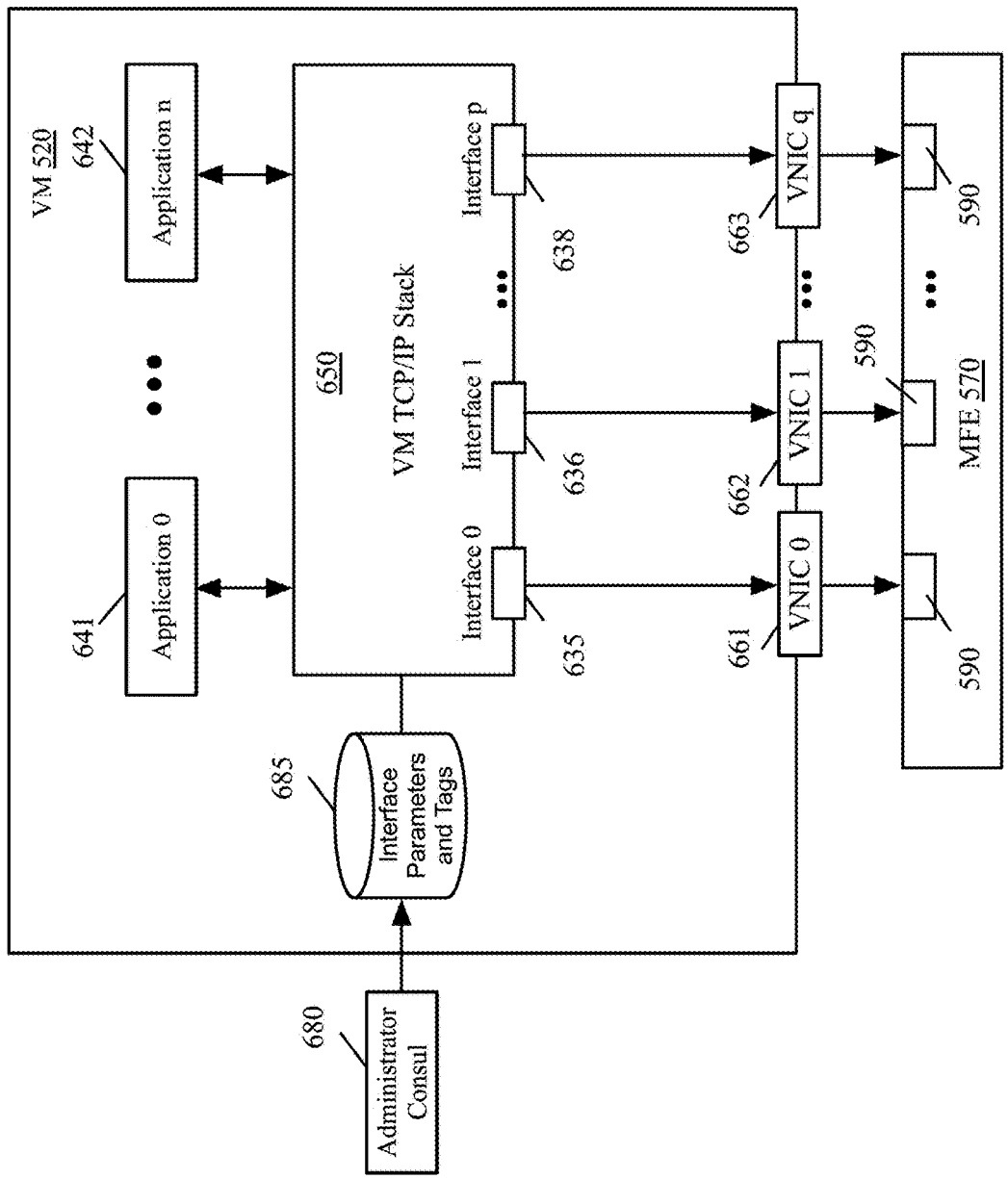
FIG. 6 conceptually illustrates a VM in some embodiments in which several network egress interfaces are tagged with the identification of applications that use the interfaces.

FIG. 6 conceptually illustrates a VM in some embodiments in which several network egress interfaces are tagged with the identification of applications that use the interfaces. The VM 600 includes several applications (or processes) 641-642, a protocol stack 650 such as TCP/IP stack, and several VNICs 661-663. The protocol stack is a set of network protocol layers and the software processes that implement the protocol. The protocol stack is different than the protocol stack (e.g., protocol stack 550 in FIG. 5) of the host machine 500 that hosts the VM 520. Some of the applications 641-642 require network access. That is, the applications require data to be processed by the TCP/IP stack 650 to produce packets and sent over a network, such as the Internet. TCP/IP stack 650 is a software construct that manipulates data received from various applications 641-642, converts the data into IP packets that can be sent through to a network (e.g., a public datacenter, an enterprise network, the Internet, etc.).

The TCP/IP stack 570 includes one or more interfaces (e.g., virtual adapters) 635-638, which are software constructs that the TCP/IP stack 650 uses to connect to a VNIC 561-560. VNICs 561-563 are software elements that receive packets from the VM TCP/IP stack 650 and forward the packets to the MFE 570. VNICs 661-663 also receive packets from the MFE and forward the packets to the VM TCP/IP stack 550 for distribution within the VM 520.

In some embodiments, interfaces 635-638 are configured by an administrator (e.g., an administrator associated with a tenant that uses the VM. The administrator defines a set of parameters for each interface. The parameters in some embodiments include an IP address that identifies the interface. The administrator also determines which application 641-642 is going to use each interface 635-638. The administrator tags each interface 635-638 with an identification of the application that is going to use the interface.

The guest operating system of the VM receives the set of parameters that defines each interface and the associated tag from an administrator consul 680 (e.g., through an API). The guest operating system of the VM stores the interface definitions and the associated tags in a set of data structures 685 (e.g., in one or more tables), which are used by the VM TCP/IP stack to identify the interfaces.

Similar to the operations of process 200, once an application 641-642 tags a socket with the application identifier and sends to the VM TCP/IP stack, the VM TCP/IP stack selects one of the interfaces 661-663 by matching the socket tag with the interface tags. When there are multiple interfaces that match a socket tag, VM TCP/IP stack selects one of the interfaces by using load balancing, round robin selection, first match selection, etc. The VM TCP/IP stack then sends the packet to the MFE through the selected egress interface.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
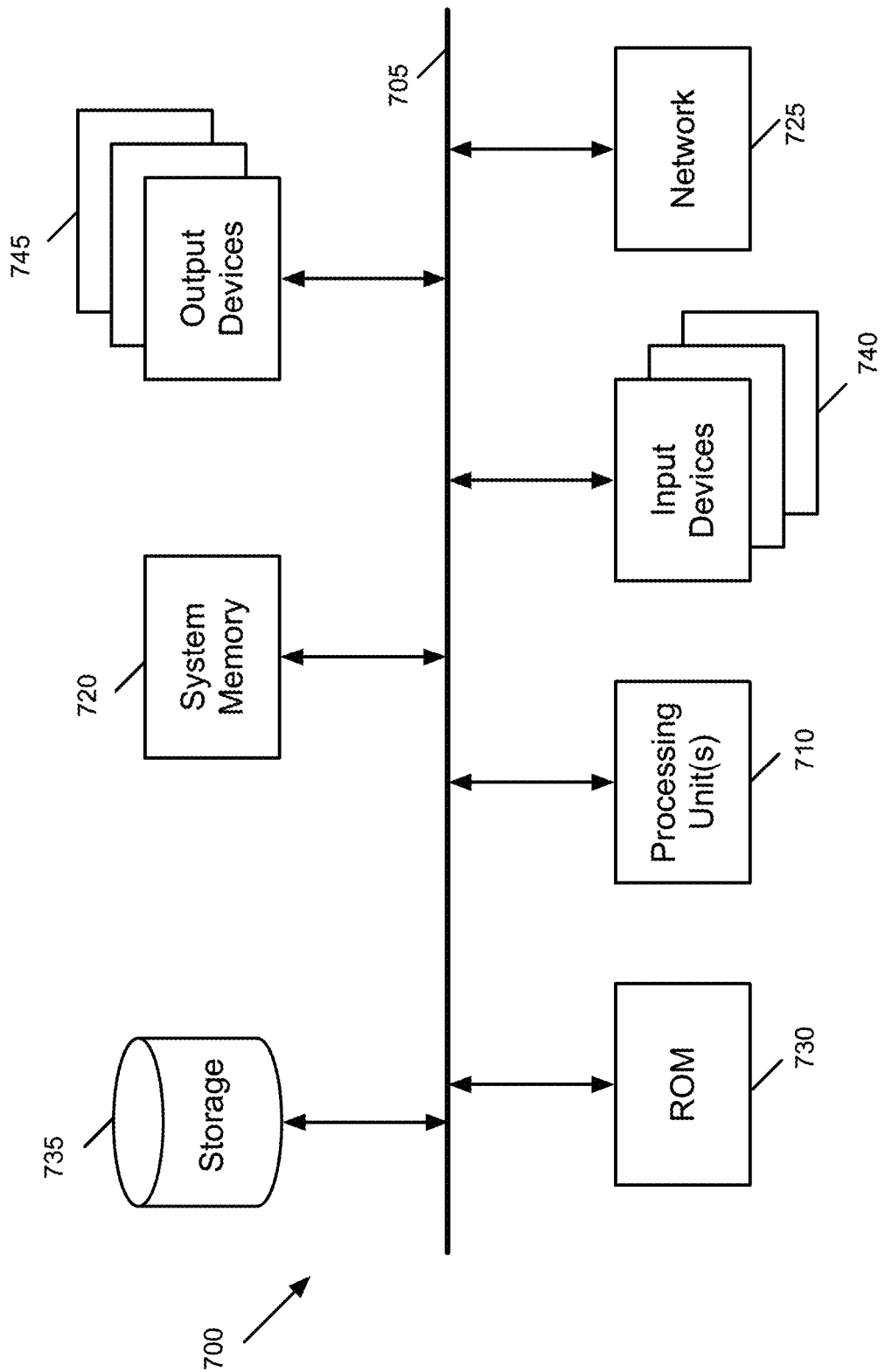
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 720, a read-only memory (ROM) 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 720, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 720 is a read-and-write memory device. However, unlike storage device 735, the system memory is a volatile read-and-write memory, such as random access memory. The system memory stores some of the instructions and data that the processor needs at runtime. In some embodiments, the invention's processes are stored in the system memory 720, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 7, bus 705 also couples electronic system 700 to a network 725 through a network adapter (not shown). In this manner, the computer can be a part of a network of computers (such as a local area network ("LAN"), a wide area network ("WAN"), an Intranet, or a network of networks, such as the Internet. Any or all components of electronic system 700 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method for networking, comprising:
   providing a plurality of network interfaces, the plurality of network interfaces comprising a first network egress interface and a second network egress interface;
   executing a plurality of applications on a computer, the plurality of applications comprising a first application;
   receiving a packet from the first application, the packet comprising a tag for identifying network egress interfaces, the tag comprising an identifier of the first application utilizing the first and second network egress interfaces;
   selecting the first network egress interface using at least the tag and a first match selection; and
   sending the packet to a destination through the first network egress interface according to a set of parameters.

2. The method of claim 1, wherein the tag further comprises the set of parameters.

3. The method of claim 1, further comprising performing load balancing to select the first network egress interface.

4. The method of claim 1, wherein the first network egress interface implements a transport control protocol/Internet protocol (TCP/IP) stack.

5. The method of claim 1, wherein the tag comprises a universally unique identifier (UUID) of the first application.

6. The method of claim 1, further comprising using a round robin selection to select the first network egress interface.

7. The method of claim 1, wherein the first network egress interface and the second network egress interface are connected to a same gateway.

8. The method of claim 1, wherein the first network egress interface is associated with the first application and a second application.

9. The method of claim 1, wherein the first network egress interface is associated with a first network egress interface, and the tag comprises a socket tag.

10. A non-transitory computer readable-medium storing a program for execution by at least one processing unit of a computer, the program comprising sets of instructions for:
    providing a plurality of network interfaces, the plurality of network interfaces comprising a first network egress interface and a second network egress interface;
    executing a plurality of applications on an electronic device;
    receiving a packet from a first application, the packet comprising a tag for identifying the network egress interface, the tag comprising an identifier of the first application utilizing network egress interfaces;
    selecting the first network egress interface using at least the tag and a first match selection; and
    sending the packet to a destination through the first network egress interface according to a set of parameters.

11. The non-transitory computer readable-medium of claim 10 non-transitory computer readable-medium, wherein the computer implements a transport control protocol/Internet protocol (TCP/IP) stack, and the TCP/IP stack is the program.

12. The non-transitory computer readable-medium of claim 10 non-transitory computer readable-medium, wherein the tag further comprises the set of parameters.

13. The non-transitory computer readable-medium of claim 10 non-transitory computer readable-medium, wherein the first network egress interface implements a transport control protocol/Internet protocol (TCP/IP) stack.

14. The non-transitory computer readable-medium of claim 10 non-transitory computer readable-medium, wherein the tag comprises a universally unique identifier (UUID) of the first application.

* * * * *